(12) United States Patent
Li

(10) Patent No.: US 12,525,880 B2
(45) Date of Patent: Jan. 13, 2026

(54) LOAD CURRENT DISTRIBUTION ADJUSTMENT DEVICE, LOAD CURRENT DISTRIBUTION ADJUSTMENT METHOD, AND LOAD CURRENT DISTRIBUTION ADJUSTMENT PROGRAM OF POWER CONVERSION DEVICE FOR ENERGY STORAGE SYSTEM

(71) Applicant: TMEIC Corporation, Chuo-ku (JP)

(72) Inventor: Haiqing Li, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 238 days.

(21) Appl. No.: 18/558,099

(22) PCT Filed: Apr. 20, 2022

(86) PCT No.: PCT/JP2022/018335
§ 371 (c)(1),
(2) Date: Oct. 30, 2023

(87) PCT Pub. No.: WO2023/203699
PCT Pub. Date: Oct. 26, 2023

(65) Prior Publication Data
US 2024/0243659 A1    Jul. 18, 2024

(51) Int. Cl.
*H02M 3/155* (2006.01)
(52) U.S. Cl.
CPC .................. *H02M 3/155* (2013.01)
(58) Field of Classification Search
CPC ..... G05F 1/575; G09G 3/20; G09G 2330/021
USPC ....................................................... 323/281
See application file for complete search history.

(56) References Cited

U.S. PATENT DOCUMENTS

2019/0348837 A1* 11/2019 Iyasu .................. H02J 1/102
2021/0091662 A1*  3/2021 Tawada ............... H02M 7/5395
2024/0243659 A1*  7/2024 Li ........................ H02J 7/34

FOREIGN PATENT DOCUMENTS

JP          4498290 B          7/2010

OTHER PUBLICATIONS

International Search Report (with English translation) & Written Opinion Issued Jun. 28, 2022, in PCT/JP2022/018335, filed on Apr. 20, 2022, therein, 10 pages.

* cited by examiner

Primary Examiner — Yemane Mehari
(74) Attorney, Agent, or Firm — Oblon, McClelland, Maier & Neustadt, L.L.P.

(57) ABSTRACT

A load current distribution adjustment device of a power conversion device for energy storage system includes a cross-current calculation unit configured to calculate a cross-current, a first correction amount calculation unit configured to calculate a first correction amount of a voltage command value on the basis of the cross-current calculated and an output voltage of the own power conversion device, a gain calculation unit configured to calculate a weighting gain on the basis of an average voltage of DC voltages and a DC voltage of the own power conversion device, a second correction amount calculation unit configured to calculate a second correction amount of the voltage command value on the basis of the first correction amount and the weighting gain, and an output current control unit configured to control the output current on the basis of the predetermined voltage command value and the second correction amount.

7 Claims, 7 Drawing Sheets

LOAD CURRENT DISTRIBUTION ADJUSTMENT DEVICE, LOAD CURRENT DISTRIBUTION ADJUSTMENT METHOD, AND LOAD CURRENT DISTRIBUTION ADJUSTMENT PROGRAM OF POWER CONVERSION DEVICE FOR ENERGY STORAGE SYSTEM

FIELD

The present invention relates to a load current distribution adjustment device, a load current distribution adjustment method, and a load current distribution adjustment program of a power conversion device for energy storage system.

BACKGROUND

In related art, there is a case where a plurality of power conversion devices (PCS: power conditioning subsystem) for energy storage system (ESS) perform self-sustaining parallel operation, for example, in a case where a power failure occurs on a system side. In a case where a plurality of power conversion devices for energy storage system (hereinafter, referred to as "ESS-PCS" or simply referred to as "PCS") perform self-sustaining parallel operation, power is supplied to a load only with the plurality of ESS-PCSs. However, for the self-sustaining parallel operation of the plurality of ESS-PCSs, it is necessary that the PCSs are synchronized with one another. Thus, the PCSs in the self-sustaining parallel operation perform parallel communication with one another to transmit/receive the system number, operating condition, output current, phase information, and the like, of each PCS to one another. In this event, the plurality of ESS-PCSs are controlled while the ESS-PCSs are divided into a master and slaves in accordance with a predetermined principle (see, for example, PTL 1).

CITATION LIST

Patent Literature

[PTL 1] JP 4498290 B

SUMMARY

Technical Problem

In a case where a plurality of ESS-PCSs are controlled while the ESS-PCSs are divided into a master and slaves, a master PCS is controlled with a fixed voltage command and at a fixed frequency and is self-driven. On the other hand, while slave PCSs are controlled with a fixed voltage command, phase information of the master is used for phase, and a cross-current ($\Delta I \rightarrow \Delta P$, $\Delta Q$) among the PCSs is detected, and a correction $\Delta V$ is made on voltage command values of the slaves through cross-current suppression control ($\Delta P$ control$\rightarrow \Delta V$). Further, a correction $\Delta \theta$ is also made on the phases ($\Delta Q$ control$\rightarrow \Delta \theta$).

However, in correction in related art, when a correction is made on the voltage command values, states of charge (SOC) (charging rates or charged conditions) of batteries have not been taken into account. Further, the ESS-PCSs in related art have been controlled only with a voltage and a frequency, and a constant voltage and a constant current are output during self-sustaining parallel operation, thus, an output current of each PCS cannot be controlled, and typically, outputs of the PCSs are equal to one another.

In a case where the outputs of the PCSs in the self-sustaining parallel operation are equal to one another, depending on the SOCs of energy storage systems, an energy storage system with a low SOC completely discharges first, and a PCS having the energy storage system stops first. In this case, the number of PCSs in the self-sustaining parallel operation which supply power to a load decreases, and thus, it is necessary to reduce load capacity.

For example, a case will be considered where a load is 1200 kW in a case of self-sustaining parallel operation of three PCSs with a rating of 500 kW. In this case, in a normal state, an output of each PCS is 1200 kW/3=400 kW, which is equal to or less than the rating of the PCS, and thus, there is no problem.

However, in a case where one of the three PCSs completely discharges and stops, the number of PCSs in the self-sustaining parallel operation becomes two. In this case, a load to be shared by each PCS becomes 1200 kW/2=600 kW, which is equal to or greater than the rating of the PCS, and thus, it is necessary to reduce load capacity.

Further, in a case where the number of corresponding PCSs in self-sustaining parallel operation decreases, a margin for a variation amount of the load also decreases, and thus, there is a risk that the remaining PCSs may stop due to overload.

For example, a case will be considered where the load is 600 kW in a case of self-sustaining parallel operation of three PCSs with a rating of 500 kW. In this case, in a normal state, a maximum load of the three PCSs is 500 kW×3=1500 kW, and thus, 1500 kW−600 kW=900 kW which corresponds to a load variation amount can be shared by the three PCSs by increasing an output by an average of 300 KW per one PCS. In other words, a margin for the load variation amount is 900 kW, and thus, there is no problem even if a load of a total of equal to or less than 900 kW is increased.

However, in a case where one of the three PCSs completely discharges and stops, the number of PCSs in the self-sustaining parallel operation becomes two. In this case, the maximum load of the two PCSs is 500 kW×2=1000 kW, and thus, an output of only 400 kW at the maximum can be increased from a current load of 600 kW. In a case where a load increases by equal to or greater than 400 kW, the output becomes equal to or greater than the rating of the PCSs, and thus, there is a risk that the PCSs may stop due to overload. Because there is a margin of only 400 kW for the load variation amount, if the load increases by equal to or greater than a total of 400 kW, there is a risk that the PCSs may stop due to overload.

It is therefore an object of the present disclosure to maintain the number of PCSs in self-sustaining parallel operation and maintain a margin for load variation by adjusting output current distribution among PCSs on the basis of battery voltage states when a plurality of PCSs for energy storage system perform self-sustaining parallel operation.

Solution to Problem

A load current distribution adjustment device of a power conversion device for energy storage system according to one aspect includes a cross-current calculation unit configured to calculate a cross-current of an own power conversion device on the basis of an average current of output currents of a plurality of power conversion devices for energy storage system in self-sustaining parallel operation and an output current of the own power conversion device, a first correction amount calculation unit configured to calculate a first correction amount of a voltage command value on the basis of the cross-current calculated by the cross-current calculation unit and an output voltage of the own power conversion device, a gain calculation unit configured to calculate a weighting gain of the own power conversion device on the basis of an average voltage of DC voltages of the plurality of power conversion devices for energy storage system and a DC voltage of the own power conversion device, a second correction amount calculation unit configured to calculate a second correction amount of the voltage command value on the basis of the first correction amount calculated by the first correction amount calculation unit and the weighting gain calculated by the gain calculation unit, and an output current control unit configured to control the output current of the own power conversion device on the basis of the predetermined voltage command value and the second correction amount calculated by the second correction amount calculation unit.

Note that the load current distribution adjustment device of the power conversion device for energy storage system according to one aspect may further include a dead zone region determination unit configured to determine whether or not the weighting gain calculated by the gain calculation unit is in a predetermined dead zone region, and, in a case where it is determined by the dead zone region determination unit that the weighting gain is in the dead zone region, the second correction amount calculation unit may calculate the second correction amount being the first correction amount, and in a case where it is determined by the dead zone region determination unit that the weighting gain is not in the dead zone region, the second correction amount calculation unit may calculate the second correction amount on the basis of the first correction amount and the weighting gain.

Further, the load current distribution adjustment device of the power conversion device for energy storage system according to one aspect may further include a change amount limiter configured to limit a change amount of the weighting gain within a predetermined change amount in a case where the change amount of the weighting gain calculated by the gain calculation unit exceeds the predetermined change amount, and, in a case where the change amount of the weighting gain is limited within the predetermined change amount by the change amount limiter, the second correction amount calculation unit may calculate the second correction amount on the basis of the first correction amount and the weighting gain after the change amount is limited within the predetermined change amount.

Further, the load current distribution adjustment device of the power conversion device for energy storage system according to one aspect may further include an upper/lower limiter configured to output, in a case where the second correction amount calculated by the second correction amount calculation unit exceeds a predetermined upper limit or a predetermined lower limit, a correction amount obtained by limiting the second correction amount within the predetermined upper limit or the predetermined lower limit as a third correction amount, and output, in a case where the second correction amount calculated by the second correction amount calculation unit does not exceed the predetermined upper limit or the predetermined lower limit, the second correction amount as the third correction amount, and the output current control unit may control the output current of the own power conversion device on the basis of the predetermined voltage command value and the third correction amount output from the upper/lower limiter.

Further, in the load current distribution adjustment device of the power conversion device for energy storage system according to one aspect, the predetermined upper limit in the upper/lower limiter may be a value with which output power of the own power conversion device based on the output current of the own power conversion device controlled by the output current control unit becomes equal to or less than rated power of the own power conversion device.

A load current distribution adjustment method of a power conversion device for energy storage system according to one aspect includes a cross-current calculation step of calculating a cross-current of an own power conversion device on the basis of an average current of output currents of a plurality of power conversion devices for energy storage system in self-sustaining parallel operation and an output current of the own power conversion device, a first correction amount calculation step of calculating a first correction amount of a voltage command value on the basis of the cross-current calculated in the cross-current calculation step and an output voltage of the own power conversion device, a gain calculation step of calculating a weighting gain of the own power conversion device on the basis of an average voltage of DC voltages of the plurality of power conversion devices for energy storage system and a DC voltage of the own power conversion device, a second correction amount calculation step of calculating a second correction amount of the voltage command value on the basis of the first correction amount calculated in the first correction amount calculation step and the weighting gain calculated in the gain calculation step, and an output current control step of controlling the output current of the own power conversion device on the basis of the predetermined voltage command value and the second correction amount calculated in the second correction amount calculation step.

A load current distribution adjustment program of a power conversion device for energy storage system according to one aspect causes a computer to execute processing of the above-described load current distribution adjustment method of the power conversion device for energy storage system.

Advantageous Effects of Invention

According to the present disclosure, it is possible to maintain the number of PCSs in self-sustaining parallel operation and maintain a margin for load variation by adjusting output current distribution among PCSs on the basis of a battery voltage state when a plurality of PCSs for energy storage system perform self-sustaining parallel operation.

DESCRIPTION OF EMBODIMENTS

A load current distribution adjustment device, a load current distribution adjustment method and a load current distribution adjustment program of the present disclosure will be described below using the drawings.

Configuration of One Embodiment

Figure 1:
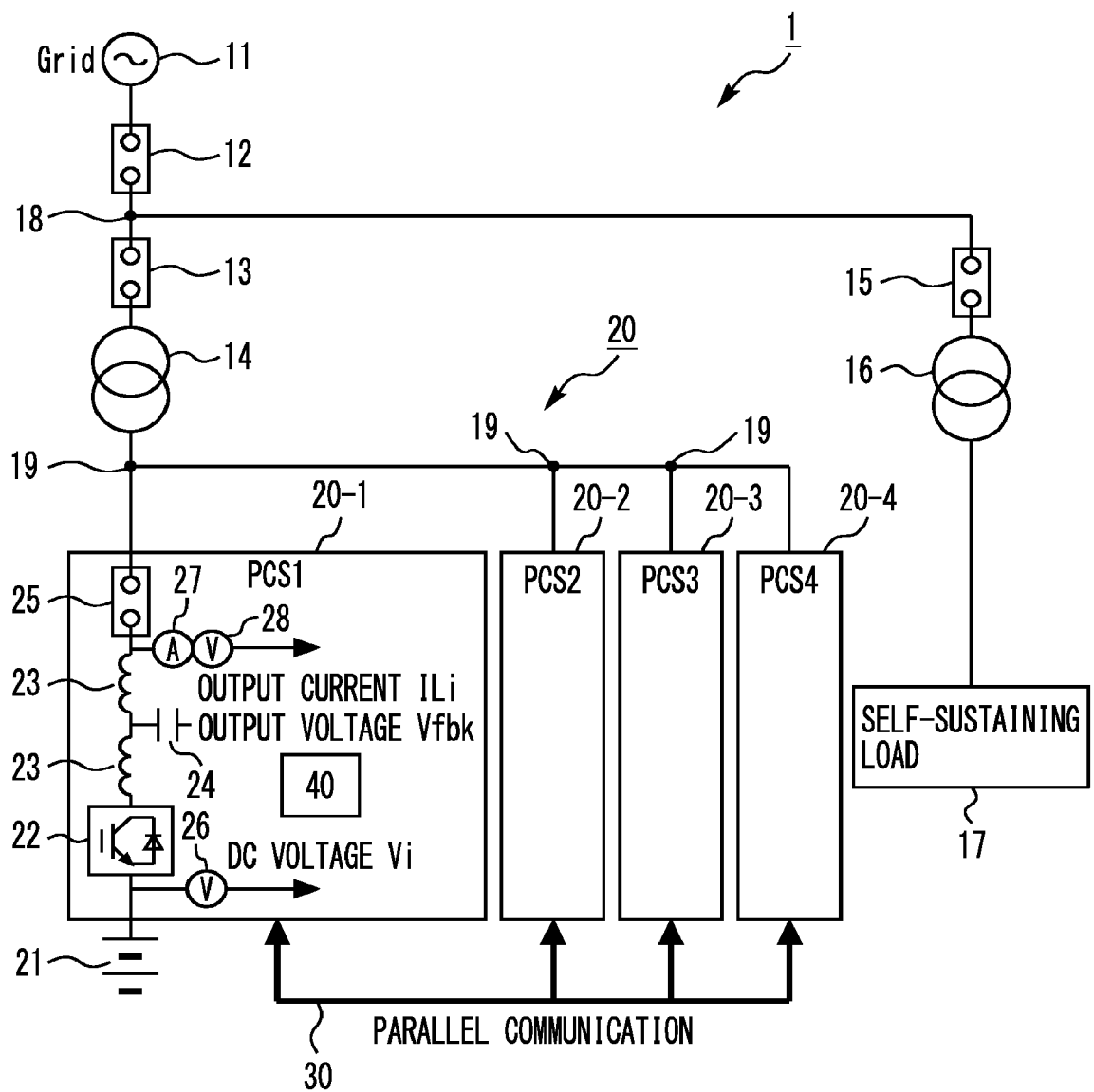
FIG. 1 is a diagram illustrating a configuration example of a power conditioning system including a plurality of power conversion devices each including a control device (load current distribution adjustment device) according to one embodiment.

FIG. 1 is a diagram illustrating a configuration example of a power conditioning system 1 including a plurality of power conversion devices 20 each including a control device (load current distribution adjustment device) 40 according to one embodiment.

As illustrated in FIG. 1, the power conditioning system 1 includes a power system 11, a first switch 12, a second switch 13, a first transformer 14, a third switch 15, a second transformer 16, a self-sustaining load 17 and a plurality of power conversion devices (PCSs) 20. An electric path branches between the first switch 12 and the second switch 13 via a connection point 18. The power system 11 is connected to the self-sustaining load 17 via the first switch 12, the connection point 18, the third switch 15 and the second transformer 16. Further, the plurality of PCSs 20 are connected to the self-sustaining load 17 via the first transformer 14, the second switch 13, the connection point 18, the third switch 15 and the second transformer 16.

The power system 11 is connected to the first switch 12. The power system 11 is, for example, a power system of AC power sent from an electric power company to factories, buildings, standard homes, and the like, and is operated at two types of frequencies of 50 Hz and 60 Hz in Japan.

The first switch 12 has one end connected to the power system 11 and the other end connected to the second switch 13 and the third switch 15 via the connection point 18. The first switch 12 opens and closes for a current from the power system 11 in accordance with a close instruction or an open instruction from a control circuit or a host device which is not illustrated, for example. The first switch 12 is closed in the normal condition, but opened upon a power failure of the power system 11, for example.

The second switch 13 has one end connected to the first switch 12 and the third switch 15 via the connection point 18 and the other end connected to the first transformer 14. The second switch 13 opens and closes for a current to be flown into the PCSs 20 and a current to be flown from the PCS 20 in accordance with a close instruction or an open instruction from the control circuit or the host device which is not illustrated, for example. The second switch 13 is closed when the energy storage system 21 which will be described later in the PCS 20 performs charging/discharging, and is opened when the energy storage system 21 does not perform charging/discharging, for example.

The first transformer 14 has one end connected to the second switch 13 and the other end connected to the PCSs 20 via connection points 19. The first transformer 14, which is electric appliance or electronic component that transforms a voltage of AC power by utilizing electromagnetic induction transforms an output voltage of the PCS into a predetermined voltage, for example.

The third switch 15 has one end connected to the first switch 12 and the second switch 13 via the connection point 18 and the other end connected to the second transformer 16. The third switch 15 opens and closes for a current to be flown from the power system 11 or the PCS 20 to the self-sustaining load 17 in accordance with coordination with a protective relay which is not illustrated or a close instruction or an open instruction from the control circuit or the host device which is not illustrated. While the third switch 15 is closed in the normal condition, upon a fault, for example, the third switch 15 is opened in coordination with the protective relay which is not illustrated to cut off a fault current to thereby prevent spreading of the fault and protect facilities, electric equipment, and the like, of the self-sustaining load 17.

The second transformer 16 has one end connected to the third switch 15 and the other end connected to the self-sustaining load 17. The second transformer 16, which is electric appliance, or the like, similar to the first transformer 14 transforms an output voltage from the power system 11 or the PCS 20 into a predetermined voltage, for example.

A plurality of the power conversion devices (PCSs) 20 are connected in parallel via the connection points 19 and have one ends connected to the first transformer 14 via the connection points 19 and the other ends respectively connected to the energy storage systems 21 which will be described later. As illustrated in FIG. 1, in the present specification, a case will be described as an example where four PCSs 20 from No. 1 to No. 4 are connected in parallel. Note that the number of PCSs 20 to be connected in parallel is not limited to four, may be any number if the PCSs can perform self-sustaining parallel operation, and may vary in accordance with a magnitude, or the like, of the self-sustaining load 17.

Here, in the present specification, configurations of the four PCSs 20 are the same, and thus, the four PCSs 20 will be described as the PCS 20 below in a case where it is not necessary to distinguish among the four PCSs 20, while the four PCSs 20 will be described with branch numbers in a case where it is necessary to distinguish among the four PCSs 20. For example, the PCS No. 1 will be described as a PCS 20-1 with a branch number, and the PCS No. 2 will be described as a PCS 20-2 with a branch number. Further, in the present specification, the configurations of the four PCSs 20 are the same, and thus, part of components of the PCS No. 2 (PCS 20-2) to the PCS No. 4 (PCS 20-4) is omitted in the drawings. Note that in a case where it is necessary to distinguish among components of the four PCSs 20, the components will be described with branch numbers.

The PCS 20 includes an energy storage system 21, an inverter 22, a reactor 23, a capacitor 24, a switch 25, a DC voltage detector 26, an output current detector 27, an output voltage detector 28, and a control device 40. Note that the four PCSs 20-1 to 20-4 are connected to one another via a LAN (local area network) cable 30 and perform parallel communication with one another. The four PCSs 20-1 to 20-4, for example, transmit/receive the system number, operating condition, output current, phase information, failure information, and the like, of each PCS to one another through parallel communication via the LAN cable 30.

For example, in a case where a power failure occurs in the power system 11, the four PCSs 20 perform self-sustaining parallel operation while the PCSs 20 are divided into a master and slaves in accordance with known predetermined control in accordance with an instruction, or the like, from the host device which is not illustrated or an operator. In this case, each PCS 20 acquires DC power supplied from the energy storage system 21 from a DC end, transforms the DC power into AC power via the inverter 22 and outputs the AC power from an AC end, so that power is supplied to the self-sustaining load 17 only with the PCSs 20.

The energy storage system (ESS) 21 is connected to a DC end of the inverter 22. The energy storage system 21, which is a battery (chemical battery) that can be repeatedly used by being charged, performs charging or discharging in accordance with an instruction from the control device 40 or the host device which is not illustrated, for example.

The inverter 22 is, for example, constructed with a plurality of switching elements such as an IGBT (insulated gate bipolar transistor), has a DC end connected to the energy storage system 21 and an AC end connected to the reactor 23. The inverter 22 is controlled by a pulse width modulation signal (PWM signal) which is a gate drive signal of the switching elements generated by a PWM (pulse width modulation) control circuit which is not illustrated. The inverter 22 acquires DC power supplied from the energy storage system 21 from the DC end, transforms the acquired DC power into AC power in accordance with control by the PWM control circuit and outputs the AC power from the AC end.

The reactor 23, which is a smoothing element provided at the AC end of the inverter 22, constitutes a filter circuit that reduces ripples (harmonics) generated by the inverter 22 along with the capacitor 24, for example.

The capacitor 24, which is a smoothing element provided at the AC end of the inverter 22 constitutes a filter circuit that reduces ripples (harmonics) generated by the inverter 22 along with the reactor 23, for example.

The switch 25 is provided between the reactor 23 and the AC end of the PCS 20, and opens and closes for an AC current to be output from the PCS 20 in accordance with coordination with the protective relay which is not illustrated or a close instruction or an open instruction from the control device 40 or the host device which is not illustrated, for example. While the switch 25 is closed in normal condition, upon a fault, for example, the switch 25 is opened in coordinate with the protective relay which is not illustrated to cut off a fault current to thereby prevent the fault from spreading to the power system 11 and the self-sustaining load 17.

The DC voltage detector 26 is, for example, positioned between the energy storage system 21 and the inverter 22 and detects a DC voltage of the PCS 20. The DC voltage detector 26 is, for example, a known DC voltage meter, DC voltage sensor, or the like, and a DC voltage Vi measured by the DC voltage detector 26 is acquired by the control device 40. Note that hereinafter, in the present specification, a symbol i indicates a system number of each PCS 20. Thus, for example, the DC voltage Vi of the PCS 20-1 (PCS No. 1) is indicated as V1, and the DC voltage Vi of the PCS 20-2 (PCS No. 2) is indicated as V2.

The output current detector 27 is, for example, positioned between the reactor 23 and the switch 25 and detects an output current ILi of the PCS 20. The output current detector 27 is, for example, a known AC current meter, AC current sensor, or the like, and the output current ILi measured by the output current detector 27 is acquired by the control device 40. Note that a symbol i indicates a system number of each PCS 20 as described above.

The output voltage detector 28 is, for example, positioned between the reactor 23 and the switch 25 and detects an output voltage Vfbk of the PCS 20. The output voltage detector 28 is, for example, a known AC voltage meter, AC voltage sensor, or the like, and the output voltage Vfbk measured by the output voltage detector 28 is acquired by the control device 40.

The LAN cable 30 connects the PCSs 20-1 to 20-4, and the PCSs 20-1 to 20-4 perform parallel communication with one another via the LAN cable 30. The PCSs 20-1 to 20-4, for example, transmit/receive the system number, operating condition, output current, phase information, failure information, and the like, of each PCS to one another through parallel communication via the LAN cable 30. The LAN cable 30 is one example of means for parallel communication among the respective PCSs 20-1 to 20-4, and other wired or wireless means, cables, or the like, may be used if the PCSs 20-1 to 20-4 can perform parallel communication with one another.

The control device 40 is, for example, provided inside or outside the PCS 20, and while wirings, or the like, are omitted in the drawings, the control device 40 is electrically connected to elements of the PCS 20 including the inverter 22 in a wired or wireless manner. Note that the control device 40 may be implemented as a function of an inverter control circuit which is not illustrated.

The control device 40 includes, for example, a processor 91 (see FIG. 6) which will be described later such as a CPU (central processing unit), an MPU (micro processing unit) and a GPU (graphics processing unit) that operates by a program being executed. The control device 40 includes a memory 92 (see FIG. 6) which will be described later and comprehensively controls operation of the PCS 20 by, for example, causing the processor 91 to operate by executing a predetermined program stored in the memory 92.

Figure 2:
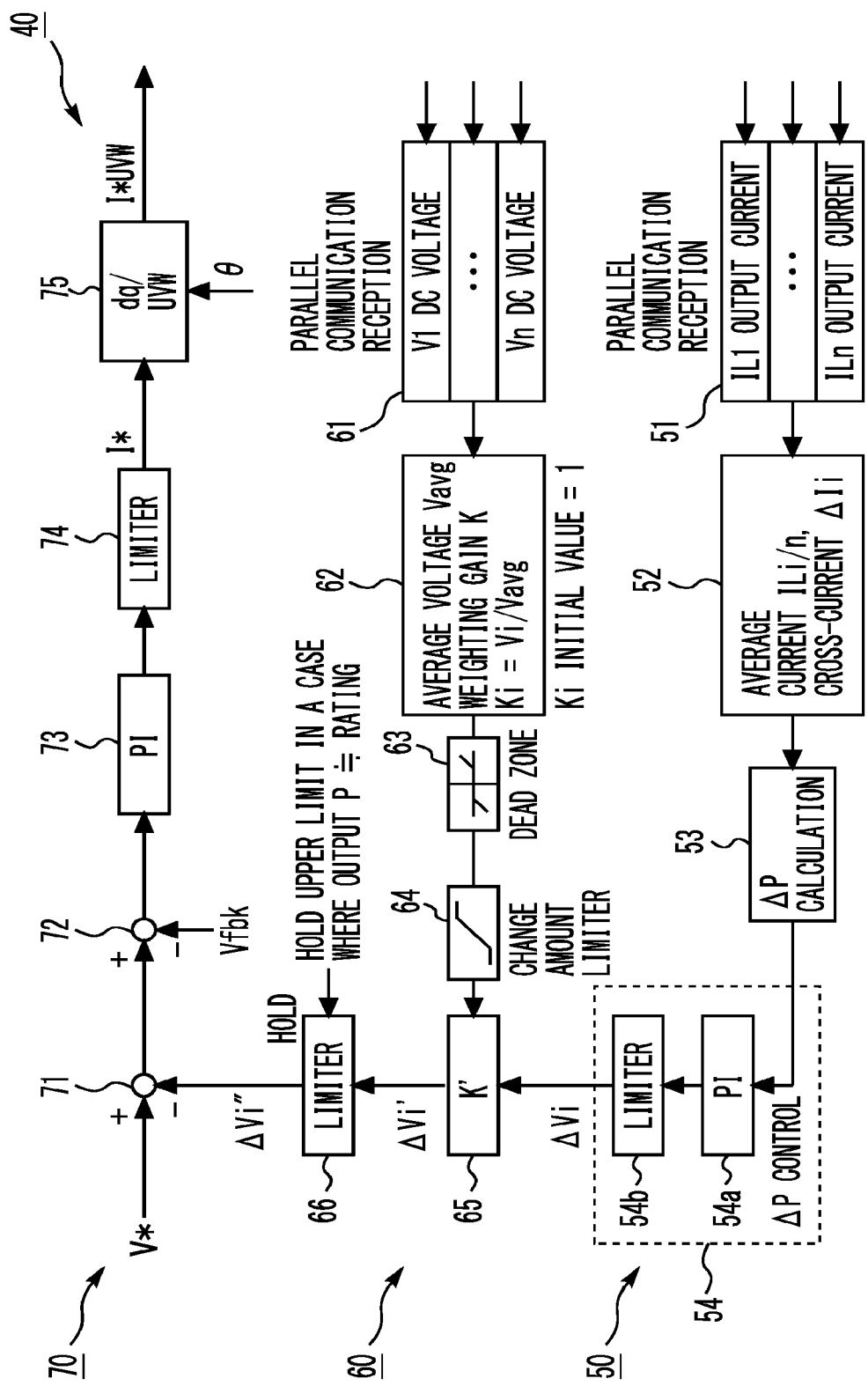
FIG. 2 is a diagram illustrating a configuration example of the control device (load current distribution adjustment device) in the power conversion device for energy storage system illustrated in FIG. 1.

FIG. 2 is a diagram illustrating a configuration example of the control device (load current distribution adjustment device) 40 in the power conversion device 20 for energy storage system illustrated in FIG. 1.

The control device 40 functions as a load current distribution adjustment device by causing the processor 91 (see FIG. 6) which will be described later to operate by executing the predetermined program stored in the memory 92 (see FIG. 6) which will be described later. In other words, the control device 40 of the present embodiment is an example of the "load current distribution adjustment device". The control device 40 comprehensively controls respective output currents ILi of the PCSs 20 by controlling the inverters 22 in accordance with respective SOCs of the energy storage systems 21 of the PCSs 20 by functioning as the load current distribution adjustment device.

The control device (load current distribution adjustment device) 40 functions as the cross-current suppression control unit 50, the load current distribution adjustment unit 60 and the output current control unit 70 by executing the predetermined program stored in the memory 92 (see FIG. 6) which will be described later, for example. Note that the above-described functions may be implemented by a load current distribution adjustment program to be executed by an arithmetic processing unit provided at the control device (load current distribution adjustment device) 40. Further, these functions may be implemented by hardware.

The cross-current suppression control unit 50 has functions of a first parallel communication reception unit 51, a cross-current calculation unit 52, a ΔP calculation unit 53 and a ΔP control unit 54. Note that the ΔP calculation unit 53 and the ΔP control unit 54 are an example of the "first correction amount calculation unit".

The first parallel communication reception unit 51 receives the respective output currents IL1 to ILn (see FIG. 1) of the PCSs 20 detected by the respective output current detectors 27 of the PCSs 20 via the LAN cable 30 that performs parallel communication. Note that hereinafter, in the present specification, a symbol n indicates the number of PCSs 20 in self-sustaining parallel operation. For example, in a case where four PCSs 20 perform self-sustaining parallel operation, n is 4. The first parallel communication reception unit 51 outputs the received output currents IL1 to ILn of the PCSs 20 to the cross-current calculation unit 52.

The cross-current calculation unit 52 calculates a cross-current ΔIi of the own PCS on the basis of an average current Iavg of the output currents IL1 to ILn of the PCSs 20 acquired from the first parallel communication reception unit 51 and the output current ILi of the own PCS 20.

The average current Iavg is calculated on the basis of expression (1). Note that a symbol n indicates the number of PCSs 20 in self-sustaining parallel operation as described above. For example, in a case where four PCSs 20 perform self-sustaining parallel operation, n is 4. Thus, the average value Iavg is calculated by dividing a value obtained by adding all the output currents IL1 to ILn of n PCSs by n.

$$Iavg = \Sigma ILj/n (j = 1 \text{ to } n) \quad (1)$$

Next, the cross-current ΔIi of the own PCS 20 is calculated on the basis of expression (2). Note that a symbol i indicates a system number of each PCS 20 as described above. For example, in a case where the own PCS is the PCS 20-2 (PCS No. 2), i is 2. Thus, the cross-current ΔIi of the own PCS is calculated by subtracting the output current ILi of the own PCS from the average current Iavg.

$$\Delta Ii = ILi - Iavg \quad (2)$$

The cross-current calculation unit 52 outputs the calculated cross-current ΔIi of the own PCS to the ΔP calculation unit 53.

The ΔP calculation unit 53 calculates effective power ΔP of the own PCS on the basis of the cross-current ΔIi of the own PCS acquired from the cross-current calculation unit 52 and the output voltage Vfbk (see FIG. 1) of the own PCS detected by the output voltage detector 28 of the own PCS.

The effective power ΔP of the own PCS 20 is calculated on the basis of expression (3). Note that a symbol i indicates a system number of each PCS 20 as described above. Thus, the effective power ΔP of the own PCS is calculated by multiplying the cross-current ΔIi of the own PCS and the output voltage Vfbk of the own PCS.

$$\Delta P = \Delta Ii \times V fbk \quad (3)$$

The ΔP calculation unit 53 outputs the calculated effective power ΔP of the own PCS to the ΔP control unit 54.

The ΔP control unit 54 includes a PI (proportional-integral) control unit 54a, and a limiter 54b. The PI control unit 54a obtains a control amount by applying PI control to the effective power ΔP of the own PCS acquired from the ΔP calculation unit 53 and outputs the control amount to the limiter 54b. The limiter 54b calculates a correction amount ΔVi of a voltage command value V* by applying a predetermined limitation on the control amount acquired from the PI control unit 54a.

Note that the voltage command value V* is a rated voltage (fixed value), and a symbol i indicates a system number of each PCS 20 as described above. Note that the correction amount ΔVi of the voltage command value V* is an example of the "first correction amount". The ΔP control unit 54 outputs the calculated correction amount ΔVi to the correction amount calculation unit 65 which will be described later. Note that a method for calculating the correction amount ΔVi by the cross-current suppression control unit 50 described above is an example of "ΔP control".

The load current distribution adjustment unit 60 has functions of a second parallel communication reception unit 61, a gain calculation unit 62, a dead zone region determination unit 63, a change amount limiter 64, a correction amount calculation unit 65 and an upper/lower limiter 66. Note that the correction amount calculation unit 65 is an example of the "second correction amount calculation unit".

The second parallel communication reception unit 61 receives DC voltages V1 to Vn (see FIG. 1) of the PCSs 20 detected by the respective DC voltage detectors 26 of the PCSs 20 via the LAN cable 30 that performs parallel communication. Note that a symbol n indicates the number of PCSs 20 in self-sustaining parallel operation as described above. The second parallel communication reception unit 61 outputs the received DC voltages V1 to Vn of the PCSs 20 to the gain calculation unit 62.

The gain calculation unit 62 calculates a weighting gain Ki of the own PCS on the basis of an average voltage Vavg of the DC voltages V1 to Vn of the PCSs acquired from the second parallel communication reception unit 61 and a DC voltage Vi of the own PCS 20.

The average voltage Vavg is calculated on the basis of expression (4). Note that a symbol n indicates the number of PCSs 20 in self-sustaining parallel operation as described above. Thus, the average voltage Vavg is calculated by dividing a value obtained by adding all the DC voltages V1 to Vn of n PCSs by n.

$$Vavg = \Sigma Vj/n (j = 1 \text{ to } n) \quad (4)$$

Next, the weighting gain Ki of the own PCS is calculated on the basis of expression (5). Note that a symbol i indicates a system number of each PCS 20 as described above. Thus, the weighting gain Ki of the own PCS is calculated by dividing the DC voltage Vi of the own PCS by the average voltage Vavg.

$$Ki = Vi/Vavg \quad (5)$$

Note that, in a case where the DC voltage Vi of the own PCS is the same as the average voltage Vavg, a value of the weighting gain Ki becomes 1. In other words, an initial value of the weighting gain Ki is 1. The gain calculation unit 62 outputs the calculated weighting gain Ki of the own PCS to the dead zone region determination unit 63.

The dead zone region determination unit 63 determines whether or not the weighting gain Ki acquired from the gain calculation unit 62 is in a predetermined dead zone region. By this means, it is possible to prevent the correction amount ΔVi of the voltage command value V* from being adjusted in a case where the weighting gain Ki is a value close to 1 (a small value) which is the initial value. Note that a threshold to be used for determining whether or not the weighting gain is in the dead zone region may be set, for example, in consideration of accuracy of the DC voltage detector 26 of the PCS 20. This can prevent a value of the weighting gain Ki from fluctuating due to a detection error of the DC voltage detector 26. Note that the initial value of the weighting gain Ki is 1 as described above.

The dead zone region determination unit 63 determines that the weighting gain Ki is in the dead zone region, for example, in a case where the value of the weighting gain Ki calculated by the gain calculation unit 62 is a value closer to 1 which is the initial value than a predetermined threshold. In this case, the dead zone region determination unit 63 outputs the initial value of 1 to the change amount limiter 64 as the value of the weighting gain Ki.

On the other hand, the dead zone region determination unit 63 determines that the weighting gain is not in the dead zone region, for example, in a case where the value of the weighting gain Ki calculated by the gain calculation unit 62 is a value farther from 1 which is the initial value than the predetermined threshold. In this case, the dead zone region determination unit 63 outputs the weighting gain Ki calculated by the gain calculation unit 62 to the change amount limiter 64 as the value of the weighting gain Ki.

The change amount limiter 64 limits the change amount of the weighting gain Ki within a predetermined change amount in a case where the change amount of the gain Ki acquired from the dead zone region determination unit 63 exceeds the predetermined change amount. In other words, the DC voltage Vi is a battery voltage of the energy storage system 21 (see FIG. 1), and thus, there is a case where the DC voltage Vi precipitously changes in a case where the battery voltage is high, that is, in accordance with a state of an SOC of the energy storage system 21. In this case, while there is a case where the weighting gain Ki calculated by the gain calculation unit 62 also precipitously changes, it is possible to cause the weighting gain Ki to moderately change by the presence of the change amount limiter 64. Further, it is also possible to cause the output of the PCS 20 to moderately change by causing the weighting gain Ki to moderately change.

In a case where the change amount limiter 64 limits the change amount of the weighting gain Ki within the predetermined change amount, the change amount limiter 64 outputs the limited weighting gain Ki' to the correction amount calculation unit 65. On the other hand, in a case where the change amount limiter 64 does not limit the change amount of the weighting gain Ki, the change amount limiter 64 outputs the weighting gain Ki acquired from the dead zone region determination unit 63 as is to the correction amount calculation unit 65 as the weighting gain Ki'.

The correction amount calculation unit 65 calculates a correction amount ΔVi' of the voltage command value V* for the own PCS on the basis of the correction amount ΔVi acquired from the ΔP control unit 54 and the weighting gain Ki' acquired from the change amount limiter 64.

The correction amount ΔVi' of the voltage command value V* for the own PCS is calculated on the basis of expression (6). Note that a symbol i indicates a system number of each PCS 20 as described above. Thus, the correction amount ΔVi' of the voltage command value V* for the own PCS is calculated by multiplying the correction amount ΔVi of the voltage command value V* for the own PCS calculated through ΔP control by the weighting gain Ki' of the own PCS.

$$\Delta Vi' = \Delta Vi \times Ki' \quad (6)$$

Note that the correction amount ΔVi' of the voltage command value V* is an example of the "second correction amount". The correction amount calculation unit 65 outputs the calculated correction amount ΔVi' of the voltage command value V* for the own PCS to the upper/lower limiter 66.

The upper/lower limiter 66 limits the correction amount ΔVi' within a predetermined upper limit or a predetermined lower limit in a case where the correction amount ΔVi' acquired from the correction amount calculation unit 65 exceeds the predetermined upper limit or the predetermined lower limit.

In a case where the upper/lower limiter 66 limits the correction amount ΔVi' within the predetermined upper limit or the predetermined lower limit, the upper/lower limiter 66 outputs the limited correction amount ΔVi" to a first voltage command value correction unit 71 which will be described later. On the other hand, in a case where the upper/lower limiter 66 does not limit the correction amount ΔVi' within the predetermined upper limit or the predetermined lower limit, the upper/lower limiter 66 outputs the correction amount ΔVi' acquired from the correction amount calculation unit 65 as is to the first voltage command value correction unit 71 as the correction amount ΔVi".

If the correction amount ΔVi' is too great, there is a possibility that output power based on the voltage command value V* and the correction amount ΔVi' may exceed the rated power of the PCS 20. Thus, by making the upper limit of the upper/lower limiter 66 variable and by limiting the upper limit of the correction amount ΔVi' by the upper/lower limiter 66, the output power P controlled on the basis of the voltage command value V* and the correction amount ΔVi" is held within an upper limit of the rated power of the PCS 20. Thus, by providing the upper/lower limiter 66, it is possible to prevent the output power P controlled on the basis of the voltage command value V* and the correction amount ΔVi" from exceeding the rated power of the PCS 20. Note that the correction amount ΔVi" of the voltage command value V* is an example of the "third correction amount".

The output current control unit 70 has functions of the first voltage command value correction unit 71, a second voltage command value correction unit 72, a PI control unit 73, a limiter 74 and a two-phase-to-three-phase conversion unit 75.

The first voltage command value correction unit 71 calculates a voltage command value V*' on the basis of the voltage command value V* which is the rated voltage (fixed value) acquired from a host device and the correction amount ΔVi" (third correction amount) of the voltage command value V* for the own PCS acquired from the upper/lower limiter 66, for example. Note that the first voltage command value correction unit 71 is an adder (subtractor) and calculates the voltage command value V*' by performing addition/subtraction of the voltage command value V* and the correction amount ΔVi". The first voltage command value correction unit 71 outputs the calculated voltage command value V*' to the second voltage command value correction unit 72.

The second voltage command value correction unit 72 calculates a voltage command value V*" on the basis of the voltage command value V*' acquired from the first voltage command value correction unit 71 and the output voltage Vfbk (see FIG. 1) of the own PCS detected by the output voltage detector 28 of the own PCS. Note that the second voltage command value correction unit 72 is an adder (subtractor) and calculates the voltage command value V*" by performing addition/subtraction of the voltage command value V*' and the output voltage Vfbk. The second voltage command value correction unit 72 outputs the calculated voltage command value V*" to the PI control unit 73.

The PI control unit 73 obtains a control amount by applying PI control to the voltage command value V*" acquired from the second voltage command value correction unit 72. The PI control unit 73 outputs the obtained control amount to the limiter 74.

The limiter 74 obtains a current command value I* by applying a predetermined limitation on the control amount acquired from the PI control unit 73. The limiter 74 outputs the obtained current command value I* to the two-phase-to-three-phase conversion unit 75.

The two-phase-to-three-phase conversion unit 75 performs two-phase-to-three-phase conversion (dq/UVW conversion) on the basis of the current command value I* acquired from the limiter 74 and a phase θ to calculate a current command value I*UVW. Note that, as described above, a plurality of PCSs 20 of the present embodiment perform self-sustaining parallel operation while the PCSs are divided into a master and slaves. Thus, the master PCS 20 is controlled with a fixed voltage command and at a fixed frequency, and thus, a phase θ of the own PCS is used for phase θ, and the master PCS 20 is self-driven. On the other hand, while the slave PCSs 20 are controlled with a fixed voltage command, information of the phase θ of the master acquired via the LAN cable 30 that performs parallel communication is used for phase θ. Further, for the slave PSCs 20 being synchronized with the master PCS 20, a correction Δθ is applied to the acquired phase θ of the master.

The two-phase-to-three-phase conversion unit 75 outputs the calculated current command value I*UVW to a PWM control circuit which is not illustrated. The PWM control circuit generates a pulse width modulation signal (PWM signal) which is a gate drive signal of the switching elements of the inverter 22 (see FIG. 1) on the basis of the current command value I*UVW and outputs the pulse width modulation signal to the inverter 22. The inverter 22 acquires DC power supplied from the energy storage system 21 from the DC end, transforms the acquired DC power into AC power in accordance with control by the PWM control circuit and outputs the AC power from the AC end.

Operation of One Embodiment

Figure 3:
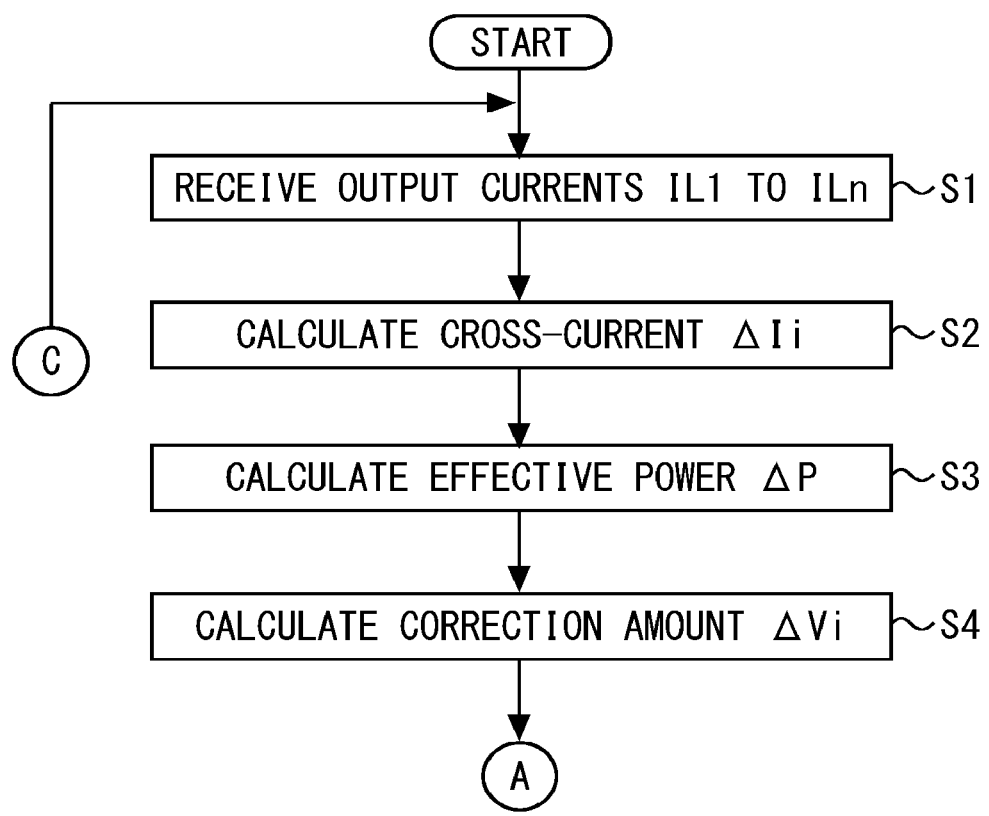
FIG. 3 is a flowchart illustrating an example of processing of a cross-current suppression control unit in the control device (load current distribution adjustment device) illustrated in FIG. 2.

FIG. 3 is a flowchart illustrating an example of processing of the cross-current suppression control unit 50 in the control device (load current distribution adjustment device) 40 illustrated in FIG. 2. The flowchart in FIG. 3 is started when a plurality of ESS-PCSs 20 start self-sustaining parallel operation, for example, in a case where a power failure, or the like, occurs on a system side. In a case where the plurality of PCSs 20 start the self-sustaining parallel operation, first, the master PCS 20 is activated and self-driven, and then the slave PCSs 20 are activated and start operation in synchronization with the master.

In step S1, the first parallel communication reception unit 51 of the cross-current suppression control unit 50 receives respective output currents IL1 to ILn (see FIG. 1) of the PCSs 20 via the LAN cable 30 that performs parallel communication.

In step S2, the cross-current calculation unit 52 of the cross-current suppression control unit 50 calculates a cross-current ΔIi of the own PCS on the basis of the average current Iavg of the output currents IL1 to ILn of the PCSs 20 and the output current ILi of the own PCS 20.

In step S3, the ΔP calculation unit 53 of the cross-current suppression control unit 50 calculates effective power ΔP of the own PCS on the basis of the cross-current ΔIi of the own PCS and the output voltage Vfbk (see FIG. 1) of the own PCS.

In step S4, the ΔP control unit 54 of the cross-current suppression control unit 50 calculates a correction amount ΔVi of the voltage command value V* for the own PCS.

Figure 4:
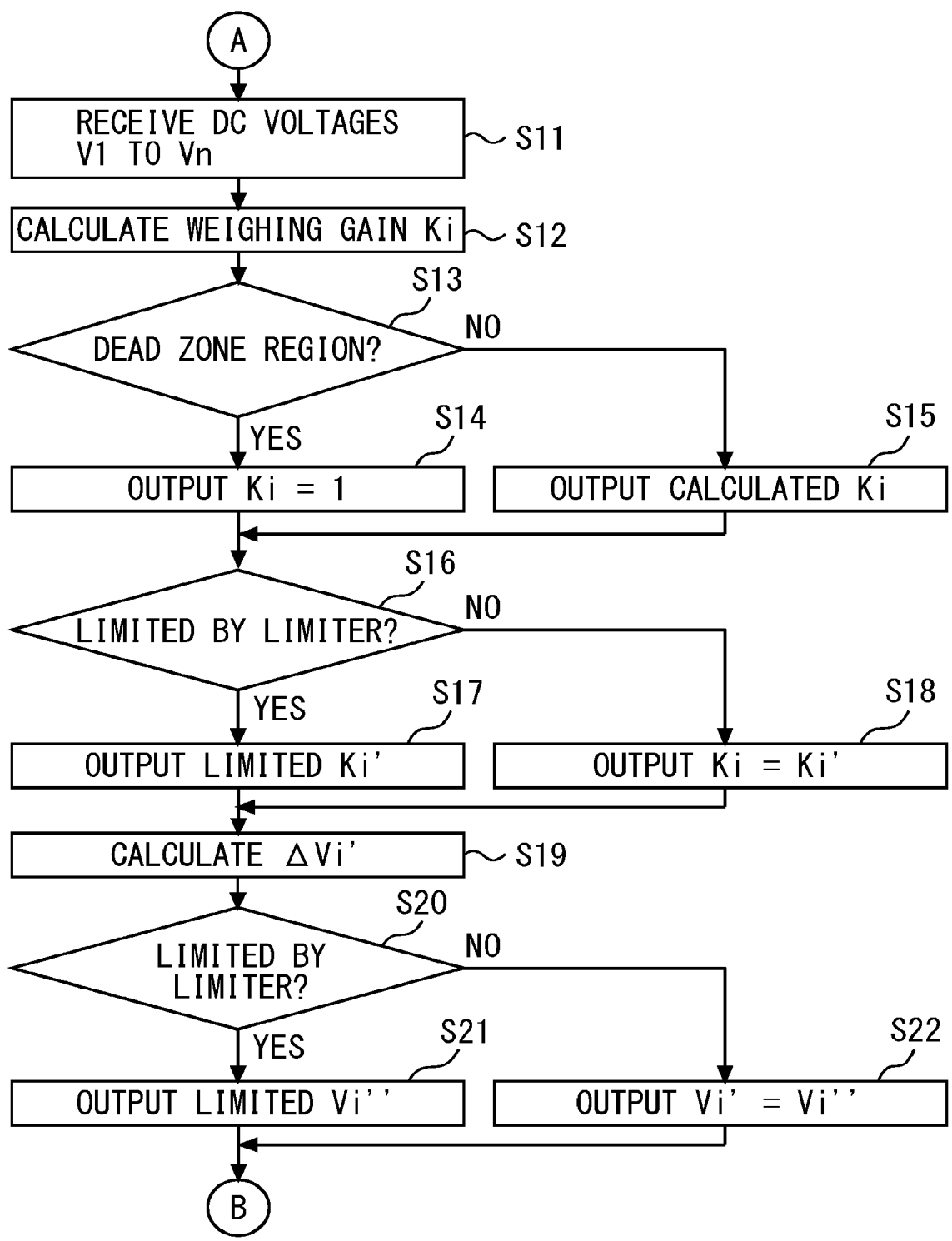
FIG. 4 is a flowchart illustrating an example of processing of a load current distribution adjustment unit in the control device (load current distribution adjustment device) illustrated in FIG. 2.

FIG. 4 is a flowchart illustrating an example of processing of the load current distribution adjustment unit 60 in the control device (load current distribution adjustment device) 40 illustrated in FIG. 2. FIG. 4 is continued from A of the flowchart illustrated in FIG. 3.

In step S11, the second parallel communication reception unit 61 of the load current distribution adjustment unit 60 receives respective DC voltages V1 to Vn (see FIG. 1) of the PCSs 20 via the LAN cable 30 that performs parallel communication.

In step S12, the gain calculation unit 62 of the load current distribution adjustment unit 60 calculates a weighting gain Ki of the own PCS on the basis of the average voltage Vavg of DC voltages V1 to Vn of the PCSs and the DC voltage Vi of the own PCS 20.

In step S13, the dead zone region determination unit 63 of the load current distribution adjustment unit 60 determines whether or not the weighting gain Ki of the own PCS is in the predetermined dead zone region. In a case where the dead zone region determination unit 63 determines that the weighting gain Ki is in the predetermined dead zone region (Yes), the processing transitions to step S14. On the other hand, in a case where the dead zone region determination unit 63 determines that the weighting gain Ki is not in the predetermined dead zone region (No), the processing transitions to step S15.

In step S14, the dead zone region determination unit 63 outputs the initial value of 1 to the change amount limiter 64 as the value of the weighting gain Ki.

In step S15, the dead zone region determination unit 63 outputs the weighting gain Ki calculated by the gain calculation unit 62 to the change amount limiter 64 as the value of the weighting gain Ki.

In step S16, the change amount limiter 64 of the load current distribution adjustment unit 60 determines whether or not the change amount of the weighting gain Ki exceeds the predetermined change amount. In a case where the change amount limiter 64 determines that the change amount of the weighting gain Ki exceeds the predetermined change amount (Yes), the processing transitions to step S17. On the other hand, in a case where the change amount limiter 64 determines that the change amount of the weighting gain Ki does not exceed the predetermined change amount (No), the processing transitions to step S18.

In step S17, the change amount limiter 64 outputs a value limited within the predetermined change amount to the correction amount calculation unit 65 as the value of the weighting gain Ki'.

In step S18, the change amount limiter 64 outputs the weighting gain Ki acquired from the dead zone region determination unit 63 as is to the correction amount calculation unit 65 as the value of the weighting gain Ki'.

In step S19, the correction amount calculation unit 65 of the load current distribution adjustment unit 60 calculates the correction amount $\Delta Vi'$ of the voltage command value V* for the own PCS on the basis of the correction amount $\Delta Vi$ acquired from the $\Delta P$ control unit 54 and the weighting gain Ki' acquired from the change amount limiter 64.

In step S20, the upper/lower limiter 66 of the load current distribution adjustment unit 60 determines whether or not the correction amount $\Delta Vi'$ exceeds the predetermined upper limit or the predetermined lower limit. In a case where the upper/lower limiter 66 determines that the correction amount $\Delta Vi'$ exceeds the predetermined upper limit or the predetermined lower limit (Yes), the processing transitions to step S21. On the other hand, in a case where the upper/lower limiter 66 determines that the correction amount $\Delta Vi'$ does not exceed the predetermined upper limit or the predetermined lower limit (No), the processing transitions to step S22.

In step S21, the upper/lower limiter 66 outputs a value limited within the predetermined upper limit or the predetermined lower limit to the first voltage command value correction unit 71 as the correction amount $\Delta Vi''$.

In step S22, the upper/lower limiter 66 outputs the correction amount $\Delta Vi'$ calculated by the correction amount calculation unit 65 as is to the first voltage command value correction unit 71 as the correction amount $\Delta Vi''$.

Figure 5:
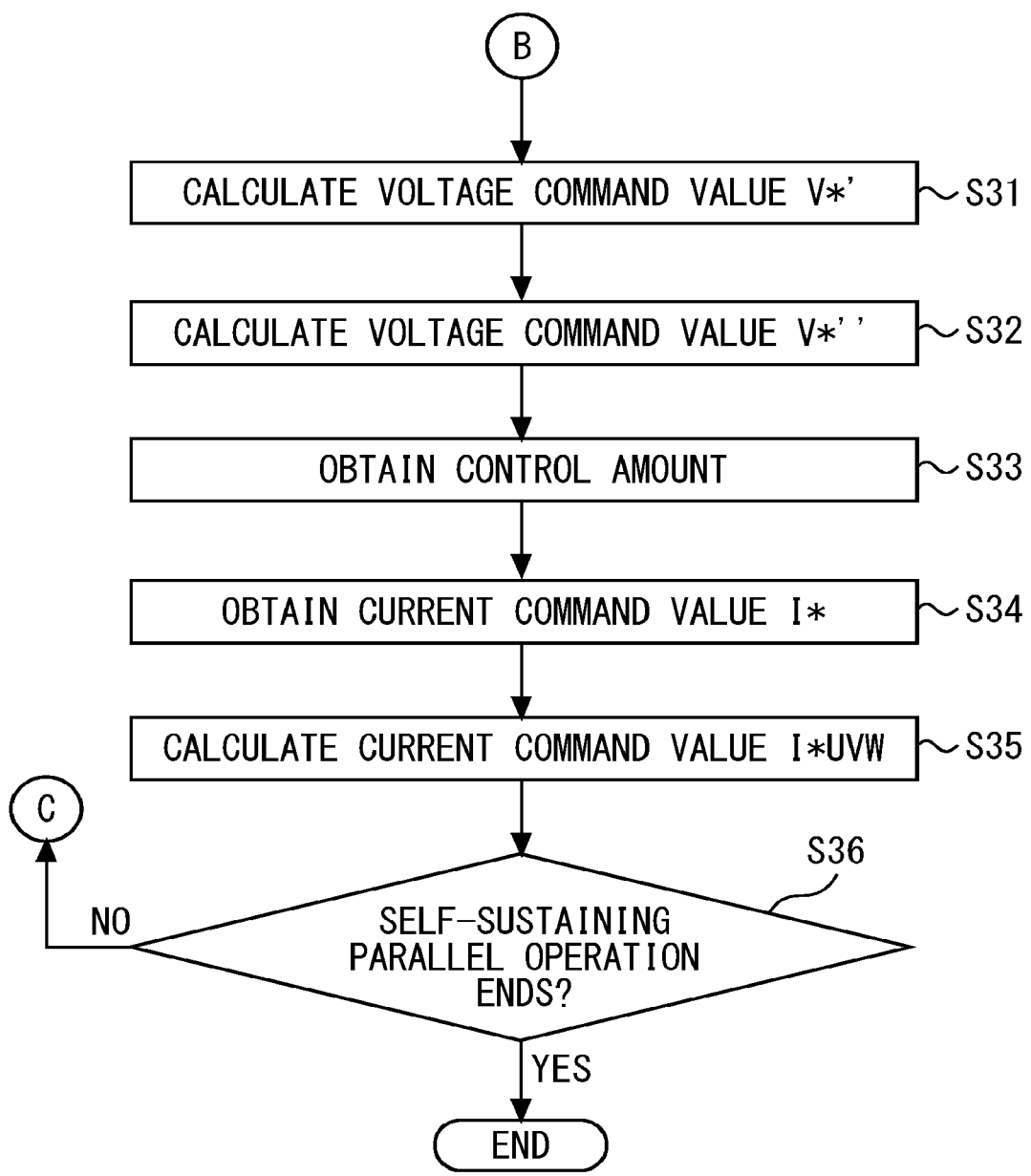
FIG. 5 is a flowchart illustrating an example of processing of an output current control unit in the control device (load current distribution adjustment device) illustrated in FIG. 2.

FIG. 5 is a flowchart illustrating an example of processing of the output current control unit 70 in the control device (load current distribution adjustment device) 40 illustrated in FIG. 2. FIG. 5 is continued from B of the flowchart illustrated in FIG. 4.

In step S31, the first voltage command value correction unit 71 of the output current control unit 70 calculates the voltage command value V*' on the basis of the voltage command value V* and the correction amount $\Delta Vi''$ of the voltage command value V* for the own PCS.

In step S32, the second voltage command value correction unit 72 of the output current control unit 70 calculates the voltage command value V*''' on the basis of the voltage command value V*' and the output voltage Vfbk (see FIG. 1) of the own PCS.

In step S33, the PI control unit 73 of the output current control unit 70 obtains a control amount by applying PI control to the voltage command value V*'''.

In step S34, the limiter 74 of the output current control unit 70 obtains the current command value I* by applying a predetermined limitation on the acquired control amount.

In step S35, the two-phase-to-three-phase conversion unit 75 of the output current control unit 70 calculates the current command value I*UVW by performing two-phase-to-three-phase conversion (dq/UVW conversion) on the basis of the current command value I* and the phase θ.

In step S35, the PWM control circuit which is not illustrated generates a pulse width modulation signal (PWM signal) which is a gate drive signal of the switching elements of the inverter 22 (see FIG. 1) on the basis of the current command value I*UVW and outputs the pulse width modulation signal to the inverter 22.

In step S36, the control device 40 determines whether or not an instruction to end self-sustaining parallel operation of the PCSs 20 is accepted from a host device, a control circuit, an operator, or the like, which is not illustrated, for example. In a case where the control device 40 determines that the instruction to end the self-sustaining parallel operation of the PCSs 20 is accepted (Yes), the control device 40 ends the flowcharts from FIG. 3 to FIG. 5. On the other hand, in a case where the control device 40 determines that the instruction to end the self-sustaining parallel operation of the PCSs 20 is not accepted (No), the processing transitions to step S1, and the processing in and after step S1 is repeated.

<Hardware Configuration Example>

Figure 6:
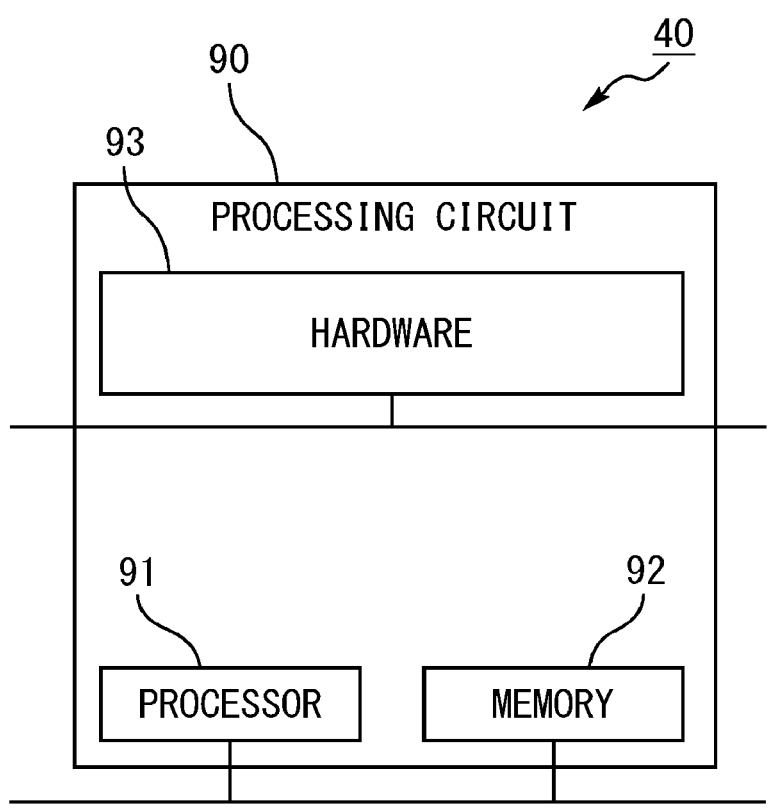
FIG. 6 is a conceptual diagram illustrating a hardware configuration example of a processing circuit provided in the control device (load current distribution adjustment device) in the embodiment illustrated in FIG. 1 to FIG. 5.

FIG. 6 is a conceptual diagram illustrating a hardware configuration example of the processing circuit 90 of the control device (load current distribution adjustment device) 40 in the embodiment illustrated in FIG. 1 to FIG. 5. The above-described functions are implemented by the processing circuit 90. As one aspect, the processing circuit 90 includes at least one processor 91 and at least one memory 92. As another aspect, the processing circuit 90 includes at least one piece of dedicated hardware 93.

In a case where the processing circuit 90 includes the processor 91 and the memory 92, the functions are implemented by software, firmware or a combination of software and firmware. At least one of the software or the firmware is described as a program. At least one of the software or the firmware is stored in the memory 92. The processor 91 implements the functions by reading and executing the program stored in the memory 92.

In a case where the processing circuit 90 includes the dedicated hardware 93, the processing circuit 90 is a single circuit, a complex circuit, a programmed processor, or a combination thereof. The functions are implemented by the processing circuit 90.

Part or all of the functions of the control device 40 may be constituted with hardware or may be constituted as a program to be executed by the processor. In other words, the control device 40 can be implemented by a computer and a program, and the program can be stored in a storage medium or can be provided through a network.

Operational Effects of One Embodiment

As described above, according to the embodiment illustrated in FIG. 1 to FIG. 6, the cross-current suppression control unit 50 of each PCS 20 calculates the cross-current $\Delta Ii$ of the own PCS and obtains the correction amount $\Delta Vi$ of the own PCS on the basis of the cross-current $\Delta Ii$ (S1 to S4). This enables each PCS 20 to control the voltage command value V* with the correction amount $\Delta Vi$ of the own PCS ($\Delta P$ control). As a result, in a case where a plurality of PCSs 20 perform self-sustaining parallel operation, the power conditioning system 1 (PCSs 20) can suppress a cross-current.

Further, according to the embodiment illustrated in FIG. 1 to FIG. 6, the load current distribution adjustment unit 60 of each PCS 20 calculates the weighting gain Ki' on the basis of the DC voltage Vi (battery voltage) of the own PCS and calculates the correction amount $\Delta Vi'$ on the basis of the weighting gain Ki' (S11 to S19). This enables the power conditioning system 1 (PCSs 20) to adjust output current distribution among PCSs 20 on the basis of the SOCs of energy storage systems 21 in PCSs 20 in a case where a plurality of PCSs 20 perform self-sustaining parallel operation. As a result, this enables the power conditioning system 1 (PCSs 20) to maintain the number of the plurality of PCSs 20 in the self-sustaining parallel operation and maintain a margin for load variation of the self-sustaining load 17.

Further, according to the embodiment illustrated in FIG. 1 to FIG. 6, the dead zone region determination unit 63 of the load current distribution adjustment unit 60 of each PCS 20 determines whether or not the weighting gain Ki calculated by the gain calculation unit 62 is in the dead zone region (S13 to S15). By this means, it is possible to prevent the correction amount ΔVi of the voltage command value V* from being adjusted in a case where the weighting gain Ki is a value close to 1 which is the initial value. As a result, this can prevent the value of the weighting gain Ki from fluctuating due to a detection error of the DC voltage detector 26.

Further, according to the embodiment illustrated in FIG. 1 to FIG. 6, the change amount limiter 64 of the load current distribution adjustment unit 60 of each PCS 20 limits the change amount of the weighting gain Ki within the predetermined change amount in a case where the change amount of the weighting gain Ki exceeds the predetermined change amount (S16 to S18). This enables the weighting gain Ki to moderately change, which makes it possible to prevent the PCS 20 from exceeding the rating.

Further, according to the embodiment illustrated in FIG. 1 to FIG. 6, the upper/lower limiter 66 of the load current distribution adjustment unit 60 of each PCS 20 obtains the correction amount ΔVi" limited within the upper limit or the lower limit of the correction amount ΔVi' (S20 to S22). By this means, the upper limit of the correction amount ΔVi' is limited, and thus, the output power P controlled on the basis of the voltage command value V* and the correction amount ΔVi" is held within an upper limit of the rated power of the PCS 20. As a result, by providing the upper/lower limiter 66, it is possible to prevent the output power P controlled on the basis of the voltage command value V* and the correction amount ΔVi" from exceeding the rated power of the PCS 20.

COMPARATIVE EXAMPLE

Figure 7:
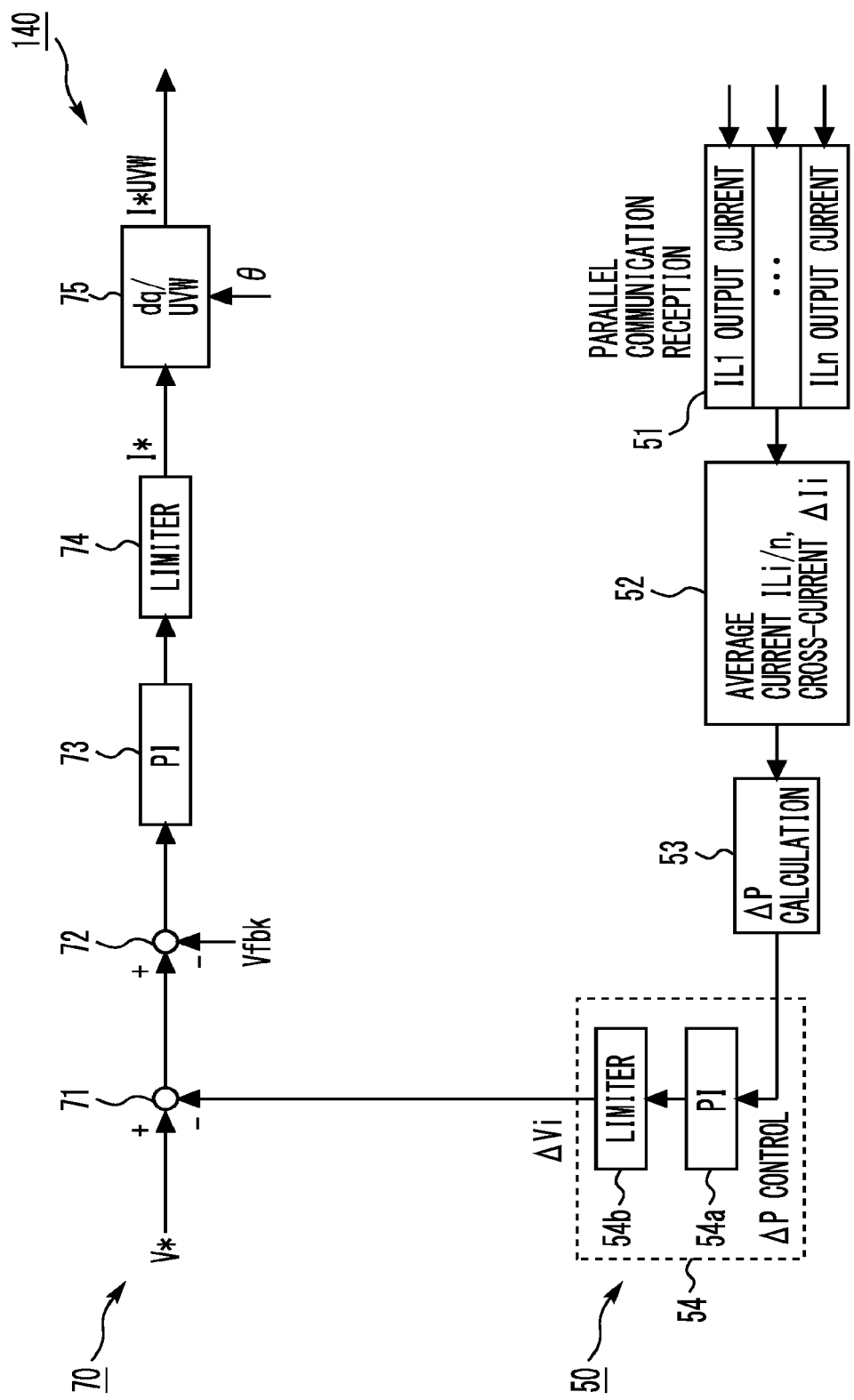
FIG. 7 is a diagram illustrating a configuration example of a control device 140 according to a comparative example.

FIG. 7 is a diagram illustrating a configuration example of the control device 140 according to a comparative example. Note that in the comparative example illustrated in FIG. 7, the same reference numerals will be assigned to components that are the same as or similar to the components in the embodiment illustrated in FIG. 1 to FIG. 6, and detailed description will be omitted or simplified. Note that while as illustrated in FIG. 7, the control device 140 according to the comparative example does not include the load current distribution adjustment unit 60 unlike with the control device 40 in the embodiment illustrated in FIG. 1 to FIG. 6, other configurations are similar to those of the control device 40 in the embodiment illustrated in FIG. 1 to FIG. 6. Note that while illustration will be omitted, in the following description, the power conversion device (PCS) including the control device 140 according to the comparative example will be referred to as a PCS 120, and a power conditioning system including a plurality of PCSs 120 will be referred to as a power conditioning system 100.

Here, in a case of self-sustaining parallel operation of a plurality of PCSs 120, for example, if all the PCSs 120 are controlled with a fixed voltage command, there is a possibility that a cross-current is generated among the PCSs 120. In other words, there is a case where a current output from each PCS 120 does not flow to the self-sustaining load 17 and flows among the PCSs 120 via the connection points 19.

However, in the comparative example illustrated in FIG. 7, the control device 140 includes the cross-current suppression control unit 50, and thus, can calculate the cross-current ΔIi of the own PCS and can obtain the correction amount ΔVi of the own PCS on the basis of the cross-current ΔIi. This enables each PCS 120 to control the voltage command value V* with the correction amount ΔVi of the own PCS (ΔP control). As a result, in a case of self-sustaining parallel operation of a plurality of PCSs 120, the power conditioning system 100 (PCSs 120) can suppress a cross-current.

However, in the comparative example illustrated in FIG. 7, in a case of the self-sustaining parallel operation of the PCSs 120, while the cross-current is taken into account, an SOC of each energy storage system 21 is not taken into account, and thus, an output from each PCS 120 becomes a constant voltage constant frequency output. Thus, in the comparative example illustrated in FIG. 7, each PCS 120 cannot control an output current, and outputs of the PCSs 120 become equal to one another. In a case where the respective outputs of the PCSs 120 in the self-sustaining parallel operation are equal to one another, depending on the SOCs of energy storage systems 21, the energy storage system 21 with a low SOC completely discharges first, and the PCS 120 having the energy storage system 21 with the low SOC stops first. In this case, in the comparative example illustrated in FIG. 7, the number of PCSs 120 in the self-sustaining parallel operation which supply power to the self-sustaining load 17 decreases, and thus, it is necessary to reduce load capacity of the self-sustaining load 17. Further, in the comparative example illustrated in FIG. 7, in a case where the number of corresponding PCSs 120 in the self-sustaining parallel operation decreases, a margin for a variation amount of the load in the self-sustaining load 17 also decreases, and thus, there is a risk that the remaining PCSs 120 may stop due to overload.

On the other hand, in the embodiment illustrated in FIG. 1 to FIG. 6, the control device 40 includes the load current distribution adjustment unit 60, and thus, the weighting gain Ki' is calculated on the basis of the DC voltage Vi (battery voltage) of the own PCS, and the correction amount ΔVi' is calculated on the basis of the weighting gain Ki'. By this means, in the embodiment illustrated in FIG. 1 to FIG. 6, in a case of self-sustaining parallel operation of a plurality of PCSs 20, SOCs of the energy storage systems 21 can be taken into account, so that it is possible to adjust output current distribution among PCSs 20 on the basis of the SOCs of the energy storage systems 21. As a result, in the embodiment illustrated in FIG. 1 to FIG. 6, the power conditioning system 1 (PCSs 20) can maintain the number of the plurality of PCSs 20 in the self-sustaining parallel operation and can maintain a margin for load variation of the self-sustaining load 17.

Supplementary Note for Embodiment

As described above, according to the embodiment illustrated in FIG. 1 to FIG. 6, the load current distribution adjustment unit 60 of the control device 40 includes the dead zone region determination unit 63. However, the configuration (function) of the dead zone region determination unit 63 may be omitted. In this case, the weighting gain Ki calculated by the gain calculation unit 62 is directly output to the change amount limiter 64 or the correction amount calculation unit 65 by the gain calculation unit 62.

Further, according to the embodiment illustrated in FIG. 1 to FIG. 6, the load current distribution adjustment unit 60 of the control device 40 includes the change amount limiter 64. However, the configuration (function) of the change amount limiter 64 may be omitted. In this case, the weighting gain Ki calculated by the gain calculation unit 62 or the weighting gain Ki limited by the dead zone region determination unit 63 is directly output to the correction amount calculation unit 65 by the gain calculation unit 62 or the dead zone region determination unit 63.

Further, according to the embodiment illustrated in FIG. 1 to FIG. 6, the load current distribution adjustment unit 60 of the control device 40 includes the upper/lower limiter 66. However, the configuration (function) of the upper/lower limiter 66 may be omitted. In this case, the correction amount ΔVi' calculated by the correction amount calculation unit 65 is directly output to the first voltage command value correction unit 71 by the correction amount calculation unit 65.

Further, according to the embodiment illustrated in FIG. 1 to FIG. 6, the weighting gain Ki is calculated on the basis of the DC voltage (=battery voltage). In FIG. 1 to FIG. 6, an assumption in using the DC voltage is that the respective energy storage systems 21 of the PCSs 20 are the same (for example, the same type, the same capacity, the same voltage range, and the like). If the energy storage systems 21 have the same voltage level, the SOC (charged state) should be the same, and typically, in a case where a plurality of PCSs 20 are connected in parallel, the energy storage systems 21 and the PCSs 20 of the same type should be purchased and connected in parallel.

On the other hand, for example, in a case where battery types or capacity of the energy storage systems 21 are different, it is impossible to determine whether or not the charged states of the energy storage systems 21 are the same on the basis of the DC voltages (=battery voltages) according to the embodiment illustrated in FIG. 1 to FIG. 6. Thus, in this case, the weighting gain Ki cannot be calculated in the method according to the embodiment illustrated in FIG. 1 to FIG. 6, and thus, the weighting gain Ki may be directly calculated from SOC information of each energy storage system 21.

In this case, the weighting gain Ki is calculated on the basis of expression (7) and expression (8). Note that there is no means for detecting the SOC information of each energy storage system 21 within the PCS 20, and thus, the SOC information needs to be acquired from each energy storage system 21. Note that SOCavg indicates an average of SOCs of the energy storage systems 21.

$$SOCavg = \Sigma SOCj/N (j = 1 \text{ to } N) \quad (7)$$

$$Ki = SOCi/SOCavg \quad (8)$$

Further, according to the embodiment illustrated in FIG. 1 to FIG. 6, while the control devices (load current distribution adjustment devices) 40 of the PCSs 20 that perform self-sustaining parallel operation have been described as an example as one aspect of the present disclosure, the present disclosure is not limited to this. The present disclosure can be implemented as a load current distribution adjustment method including processing steps to be performed in units of the control devices (load current distribution adjustment devices) 40 of the PCSs 20 that perform self-sustaining parallel operation.

Further, the present disclosure can be implemented as a load current distribution adjustment program for causing a computer to execute the processing steps in the units of the control devices (load current distribution adjustment devices) 40 of the PCSs 20 that perform self-sustaining parallel operation.

Further, the present disclosure can also be implemented as a storage medium (non-transitory computer readable medium) in which the load current distribution adjustment program is stored. The load current distribution adjustment program can be stored in, for example, a removable disc such as a CD (compact disc), a DVD (digital versatile disc) and a USB (universal serial bus) memory and can be distributed. Note that the load current distribution adjustment program may be uploaded on a network via a network interface, or the like, which is not illustrated, provided in the control device 40 or may be downloaded from the network and stored in the memory 92, or the like.

Features and advantages of the embodiment would be clear from the above detailed description. This intends to indicate that the claims extend to features and advantages of the embodiment described above within a range not deviating from the spirit and the scope of the claims. Further, a person skilled in the art could easily conceive of any modification and change. Thus, the scope of the embodiment having inventiveness is not intended to be limited to that described above and can incorporate appropriate modifications and equivalents included in the scope disclosed in the embodiment.

REFERENCE SIGNS LIST

- 1 Power conditioning system
- 11 Power system
- 12 First switch
- 13 Second switch
- 14 First transformer
- 15 Third switch
- 16 Second transformer
- 17 Self-sustaining load
- 18 Connection point
- 20, 20-1 to 20-4 Power conversion device (PCS, ESS-PCS)
- 21 Energy storage system (ESS)
- 22 Inverter
- 23 Reactor
- 24 Capacitor
- 25 Switch
- 26 DC voltage detector
- 27 Output current detector
- 28 Output voltage detector
- 30 LAN cable
- 40 Control device (load current distribution adjustment device)
- 50 Cross-current suppression control unit
- 51 First parallel communication reception unit
- 52 Cross-current calculation unit
- 53 ΔP calculation unit
- 54 ΔP control unit
- 54*a* PI control unit
- 54*b* Limiter
- 60 Load current distribution adjustment unit
- 61 Second parallel communication reception unit
- 62 Gain calculation unit
- 63 Dead zone region determination unit
- 64 Change amount limiter
- 65 Correction amount calculation unit
- 66 Upper/lower limiter
- 70 Output current control unit
- 71 First voltage command value correction unit 72 Second voltage command value correction unit
73 PI control unit
74 Limiter
75 Two-phase-to-three-phase conversion unit
91 Processor
92 Memory
93 Hardware
100 Power conditioning system
120 Power conversion device (PCS)
140 Control device
i System number
I* Current command value
Iavg Average current
IL1 to ILn Output current
ILi Output current
Ki, Ki' Weighting gain
n Number
P Output power
V*, V*', V*" Voltage command value
V1 to Vn DC voltage
Vavg Average voltage
Vfbk Output voltage
Vi DC voltage
ΔIi Cross-current
ΔP Effective power
ΔV Correction
ΔVi, ΔVi', ΔVi" Correction amount
Δθ Correction
θ Phase

The invention claimed is:

1. A load current distribution adjustment device of a power conversion device for energy storage system, comprising:
 a cross-current calculation unit configured to calculate a cross-current of an own power conversion device on a basis of an average current of output currents of a plurality of power conversion devices for energy storage system in self-sustaining parallel operation and an output current of the own power conversion device;
 a first correction amount calculation unit configured to calculate a first correction amount of a voltage command value on a basis of the cross-current calculated by the cross-current calculation unit and an output voltage of the own power conversion device;
 a gain calculation unit configured to calculate a weighting gain of the own power conversion device on a basis of an average voltage of DC voltages of the plurality of power conversion devices for energy storage system and a DC voltage of the own power conversion device;
 a second correction amount calculation unit configured to calculate a second correction amount of the voltage command value on a basis of the first correction amount calculated by the first correction amount calculation unit and the weighting gain calculated by the gain calculation unit; and
 an output current control unit configured to control the output current of the own power conversion device on a basis of the predetermined voltage command value and the second correction amount calculated by the second correction amount calculation unit.

2. The load current distribution adjustment device of the power conversion device for energy storage system according to claim 1, further comprising
 a dead zone region determination unit configured to determine whether or not the weighting gain calculated by the gain calculation unit is in a predetermined dead zone region,
 wherein, in a case where it is determined by the dead zone region determination unit that the weighting gain is in the dead zone region, the second correction amount calculation unit calculates the second correction amount being the first correction amount, and in a case where it is determined by the dead zone region determination unit that the weighting gain is not in the dead zone region, the second correction amount calculation unit calculates the second correction amount on the basis of the first correction amount and the weighting gain.

3. The load current distribution adjustment device of the power conversion device for energy storage system according to claim 1, further comprising
 a change amount limiter configured to limit a change amount of the weighting gain within a predetermined change amount in a case where the change amount of the weighting gain calculated by the gain calculation unit exceeds the predetermined change amount,
 wherein, in a case where the change amount of the weighting gain is limited within the predetermined change amount by the change amount limiter, the second correction amount calculation unit calculates the second correction amount on a basis of the first correction amount and the weighting gain after the change amount is limited within the predetermined change amount.

4. The load current distribution adjustment device of the power conversion device for energy storage system according to claim 1, further comprising
 an upper/lower limiter configured to output, in a case where the second correction amount calculated by the second correction amount calculation unit exceeds a predetermined upper limit or a predetermined lower limit, a correction amount obtained by limiting the second correction amount within the predetermined upper limit or the predetermined lower limit as a third correction amount, and output, in a case where the second correction amount calculated by the second correction amount calculation unit does not exceed the predetermined upper limit or the predetermined lower limit, the second correction amount as the third correction amount,
 wherein the output current control unit controls the output current of the own power conversion device on a basis of the predetermined voltage command value and the third correction amount output from the upper/lower limiter.

5. The load current distribution adjustment device of the power conversion device for energy storage system according to claim 4, wherein the predetermined upper limit in the upper/lower limiter is a value with which output power of the own power conversion device based on the output current of the own power conversion device controlled by the output current control unit becomes equal to or less than rated power of the own power conversion device.

6. A load current distribution adjustment method of a power conversion device for energy storage system, comprising:
 a cross-current calculation step of calculating a cross-current of an own power conversion device on a basis of an average current of output currents of a plurality of power conversion devices for energy storage system in self-sustaining parallel operation and an output current of the own power conversion device;
 a first correction amount calculation step of calculating a first correction amount of a voltage command value on a basis of the cross-current calculated in the cross-current calculation step and an output voltage of the own power conversion device;

a gain calculation step of calculating a weighting gain of the own power conversion device on a basis of an average voltage of DC voltages of the plurality of power conversion devices for energy storage system and a DC voltage of the own power conversion device;

a second correction amount calculation step of calculating a second correction amount of the voltage command value on a basis of the first correction amount calculated in the first correction amount calculation step and the weighting gain calculated in the gain calculation step; and an output current control step of controlling the output current of the own power conversion device on a basis of the predetermined voltage command value and the second correction amount calculated in the second correction amount calculation step.

7. A non-transitory computer-readable storage medium storing a load current distribution adjustment program of a power conversion device for energy storage system that causes a computer to execute processing of the load current distribution adjustment method of the power conversion device for energy storage system according to claim 6.

* * * * *